(12) United States Patent
Palm et al.

(10) Patent No.: US 12,492,333 B2
(45) Date of Patent: Dec. 9, 2025

(54) METHOD OF TREATING A SUBTERRANEAN FORMATION WITH DELAYED ACID SYSTEM

(71) Applicant: Baker Hughes Oilfield Operations LLC, Houston, TX (US)

(72) Inventors: Dustin Palm, Cypress, TX (US); Frances H. DeBenedictis, Spring, TX (US); Harold Gene Hudson, The Woodlands, TX (US); Sandra L. Berry, Tomball, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/144,451

(22) Filed: May 8, 2023

(65) Prior Publication Data

US 2024/0376373 A1 Nov. 14, 2024

(51) Int. Cl.
E21B 43/27 (2006.01)
C09K 8/74 (2006.01)

(52) U.S. Cl.
CPC ............... *C09K 8/74* (2013.01); *E21B 43/27* (2020.05)

(58) Field of Classification Search
CPC .................. C09K 8/74; E21B 43/27
See application file for complete search history.

(56) References Cited

U.S. PATENT DOCUMENTS

| | | |
|---|---|---|
| 5,529,125 A | 6/1996 | Di Lullo Arias et al. |
| 6,794,524 B1 | 9/2004 | Imperante et al. |
| 7,059,414 B2 | 6/2006 | Rae et al. |
| 11,015,110 B2 | 5/2021 | Berry et al. |
| 11,390,799 B2 | 7/2022 | Zakaria et al. |
| 2005/0054540 A1 | 3/2005 | Qu et al. |
| 2006/0131022 A1 | 6/2006 | Rae et al. |
| 2009/0253595 A1* | 10/2009 | Qu .................. C09K 8/602 507/266 |
| 2011/0015100 A1* | 1/2011 | Sun .................. C09K 8/90 507/211 |
| 2014/0000890 A1* | 1/2014 | Sun .................. C09K 8/725 507/225 |
| 2015/0344771 A1 | 12/2015 | Jiang et al. |
| 2019/0382649 A1 | 12/2019 | Jian et al. |
| 2020/0157407 A1* | 5/2020 | Berry ............... E21B 41/02 |
| 2022/0389305 A1 | 12/2022 | Zakaria |

FOREIGN PATENT DOCUMENTS

| | | | |
|---|---|---|---|
| WO | 2014004697 A2 | 1/2014 | |
| WO | 2017040553 A1 | 3/2017 | |
| WO | WO-2018217200 A1 * | 11/2018 | ........... C09K 8/52 |
| WO | WO-2020257076 A1 * | 12/2020 | ........... C07C 215/40 |

\* cited by examiner

*Primary Examiner* — Silvana C Runyan
(74) *Attorney, Agent, or Firm* — Baker Hughes Company

(57) ABSTRACT

A polymer-free fluid may be used to delay reaction of hydrofluoric acid with a subterranean formation. The fluid contains an organic compound having a bifunctional group, HF or a HF-generating compound, urea and an organophosphonate.

19 Claims, No Drawings

METHOD OF TREATING A SUBTERRANEAN FORMATION WITH DELAYED ACID SYSTEM

FIELD

The disclosure relates to a polymer-free aqueous delayed acid system for stimulation of subterranean formations and methods of using the same. The aqueous system contains an organic compound containing a bifunctional group having at least one hydroxyl group and at least one quaternary or phosphonium group; a HF or a HF-generating component; urea or a urea derivative; and an organophosphonate.

BACKGROUND

Acid fracturing and matrix acidizing are the most prevalent methods for stimulating sandstone formations. In acid fracturing, acidizing fluid is pumped into the well at a pressure sufficient to create or enhance fractures. Fracture faces are then etched with the acid and the acid is allowed to react with the surrounding formation to create conductive channels. Penetration of the acid deep into the formation is difficult in acid fracturing if the acid reacts too quickly.

In matrix acidizing, often used to enhance near-wellbore permeability, the acidizing fluid is injected into the formation at pressures lower than those which induce fracturing. The acid or acid-forming material reacts with minerals in the formation and forms conductive highly branched flow channels or wormholes, thereby increasing permeability of the formation and improving hydrocarbon flow rate. As subsequent fluid is pumped into the formation, it tends to flow along the created channels, leaving the rest of the formation untreated. The successful creation of wormholes is made difficult if the acid reacts too quickly and dissolves the formation matrix.

Conventional acidizing fluids contain the combination of HCl and HF (or a HF-generating component). In stimulation of sandstone formations, hydrofluoric acid or a HF generating component is preferred due to its reactivity with silica and silicates (such as clays and feldspars). Hydrofluoric acid, however, tends to react very quickly with authigenic clays, such as smectite, kaolinite, illite and chlorite, especially when temperatures within the well exceed 150° F. Due to the rapid reaction of HF, conventional fluids penetrate only a few inches within the formation before being spent. Simultaneously, precipitation of various alumina and/or silicate complexes occur as a result of the reaction of the hydrofluoric acid with clays and silts. Such precipitates plug pore spaces and reduce the porosity and permeability of the formation, thus impairing flow potential. In addition, since clays are normally a part of the cementitious materials that hold sand grains of sandstone formations together, the dissolution of clay also weakens and unconsolidates the sandstone matrix in the vicinity of the wellbore, thus causing damage to the formation. The damaging effects due to both the unconsolidation of the matrix and the precipitation of complexes clog pore spaces within the formation.

U.S. Pat. No. 5,529,125 addresses a method of reducing the reaction rate of hydrofluoric acid with the immediate area of the formation surrounding the wellbore in order for the acid to penetrate further into the formation. The method provides deeper penetration of HF into sandstone formations than conventional hydrochloric-hydrofluoric acid (HCl—HF) systems by the addition of an organophosphonate to the treatment fluid. Such fluids have been shown to reduce precipitate formation common to conventional HCl—HF acidizing systems by forming a temporary protective film on clay surfaces during reaction of the HF. This allows the acid to attack additional clay, silicates and quartz surfaces before being fully spent. Such treatment fluids are thus useful in the removal of clay, quartz, silicate fines and scales more effectively than conventional HF solutions. Still, rapid reaction (or spending) of the acid during acidizing occurs with the addition of such materials.

In order to further delay the reaction of the acid with the formation, fluids have been modified by the addition of polymeric gellants. Such methods have however also been proven to be ineffective and polymeric gellants are known to damage the formation.

More effective methods of retarding the acid reaction with the formation have therefore been sought.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY

An acidizing treatment fluid with delayed reactivity of HF or HF-generating components may contain an organophosphonate compound, urea or a urea derivative and an organic bifunctional compound containing at least one hydroxyl group and at least one quaternary or phosphonium group. The treatment fluid may further contain (i) a zirconium containing compound; (ii) fluoroboric acid or a boron compound capable of being hydrolyzed to form a $BF_4^-$ complex when exposed to $F^-$ or a hydrofluoric acid; and/or (iii) an aluminum material or a combination thereof. The presence of the organic bifunctional group and urea or urea derivative in the fluid delays the reaction of the fluid with bentonite clay in the formation. Further delay of the acid is attributable to the presence of the zirconium and/or boric acid in the fluid.

In an embodiment, the aqueous acidizing fluid may contain, in addition to the HF or a HF-generating component, an organic bifunctional compound, urea or a urea derivative and an organophosphonate of the structure:

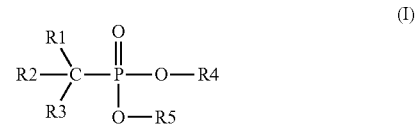

(I)

wherein R1, R2 and R3 are independently selected from the group consisting of hydrogen, alkyl, aryl, phosphonates, phosphates, acyl amine, hydroxy and carboxyl groups and R4 and R5 are independently selected from the group consisting of hydrogen, sodium, potassium, ammonium and organic radicals.

In another embodiment, an aqueous polymer-free composition is disclosed for use in acidizing a subterranean formation. The composition contains choline chloride; a HF or a HF-generating component; urea or a urea derivative; an organophosphonate of the structure:

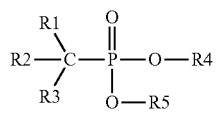

(I)

wherein R1, R2 and R3 are independently selected from the group consisting of hydrogen, alkyl, aryl, phosphonates, phosphates, acyl amine, hydroxy and carboxyl groups and R4 and R5 are independently selected from the group consisting of hydrogen, sodium, potassium, ammonium and organic radicals; and at least one member selected from the group consisting of: (i) a zirconium compound selected from the group consisting of zirconium lactate, sodium zirconium lactate; zirconium sulfate; zirconium tetrachloride; zirconium carbonate; zirconium acetate; zirconium orthosulfate; zirconium oxychloride; zirconium ammonium carbonate or zirconium acetylacetonate or a combination thereof; and (ii) boric acid.

In another embodiment, a method of treating a subterranean formation is provided wherein the formation is stimulated with an acidizing composition of one of the above paragraphs and permeability is enhanced with the acidizing composition.

In another embodiment, a method of stimulating a sandstone formation is provided wherein an aqueous polymer-free acidizing composition is first introduced into a metallic tubular. The acidizing composition contains an organic bifunctional group containing at least one hydroxyl group and at least one quaternary or phosphonium group; a HF or a HF-generating component; urea or a urea derivative; and an organophosphonate of the structure:

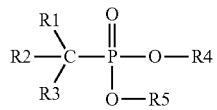

(I)

wherein R1, R2 and R3 are independently selected from the group consisting of hydrogen, alkyl, aryl, phosphonates, phosphates, acyl amine, hydroxy and carboxyl groups and R4 and R5 are independently selected from the group consisting of hydrogen, sodium, potassium, ammonium and organic radicals; boric acid; and zirconium lactate, sodium zirconium lactate; zirconium sulfate; zirconium tetrachloride; zirconium carbonate; zirconium acetate; zirconium orthosulfate; zirconium oxychloride; zirconium ammonium carbonate or zirconium acetylacetonate or a combination thereof. Creation and penetration of wormholes are enhanced by retarding or slowing down the spending of the HF or HF-generating compound with the combination of organic bifunctional group, urea or urea derivative, an organophosphonate, zirconium containing compound and boric acid.

DETAILED DESCRIPTION

The following description provides specific details, such as material types and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry.

Characteristics and advantages of the present disclosure and additional features and benefits will be readily apparent to those skilled in the art upon consideration of the following detailed description of exemplary embodiments of the present disclosure. It should be understood that the description herein, being of exemplary embodiments, is not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ."

Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The use of the terms "a" and "an" and "the" and similar referents in the context of describing the invention (especially in the context of the following claims) are to be construed to cover both the singular and the plural, unless otherwise indicated herein or clearly contradicted by context.

All ranges disclosed herein are inclusive of the endpoints. A numerical range having a lower endpoint and an upper endpoint shall further encompass any number and any range falling within the lower endpoint and the upper endpoint. For example, every range of values (in the form "from a to b" or "from about a to about b" or "from about a to b." "from approximately a to b," "between about a and about b," and any similar expressions, where "a" and "b" represent numerical values of degree or measurement is to be understood to set forth every number and range encompassed within the broader range of values and inclusive of the endpoints.

"Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

All references are incorporated herein by reference.

The aqueous fluids disclosed herein are useful in retarding or delaying reaction of the hydrofluoric acid with the formation (as well as clays) and are especially useful in delaying the release of HF into the formation. The fluids may be used without the need for a polymer. Use of the aqueous delayed acid system minimizes formation damage.

The aqueous fluid need not contain any oil or other components (such as emulsifying agents) since the fluid is not an emulsion. As such, the solvent of the fluid may be just water. The water of the aqueous delayed acid system may be fresh water or brine.

When used in acidizing, the aqueous delayed acid system delays spending of the acid and thus enhances the creation and penetration of the wormholes. This enhances the permeability of the formation. Acidizing operations include fracture acidizing wherein the well is subjected to a pressure sufficient to enhance or create a fracture. Conductive branched flow channels are thereby created for the transfer or produced hydrocarbons from the well. In addition, acidizing treatments include those, like matrix acidizing, where the fluid is pumped into the well at pressures below that needed to create or enlarge a fracture.

It is believed the aqueous fluid disrupts hydrogen bonding of the water or brine of the aqueous fluid as well as reducing diffusion of protons to the surface of the rock which makes them less available for reaction as the rate of acid dissociation is reduced. Slowing the rate of reaction further allows deeper penetration as well as convective transport of the acid into the formation compared to fluids containing (the same equivalent amount and molality) of acid only, thus increasing the formation permeability. In an embodiment, introduction of the fluid results in the slowing of proton transport to the wormhole wall. This, in turn, increases retardation of the HF attacking the formation.

In an embodiment, the fluid is used to slow down the reactivity of fluoride ions when pumped into a sandstone formations. Sandstone formations include subterranean sandstone or siliceous formations composed of silica and/or silicates (such as quartz and feldspar), bonded together by cementitious materials such as carbonate (calcite or calcium carbonate) and clays.

In addition to sandstone formation, the aqueous delayed acid system may be used in acidizing carbonate and other reservoirs including geothermal reservoirs.

The aqueous acid system is most effective in the creation and enhancement of wormholes at elevated temperatures. By controlling releasing of the hydrogen fluoride and slowing down spending of the HF or HF-generating compound, the acid can penetrate wormholes farther and deeper in the formation and provide better results in regain production.

In an embodiment, the aqueous acid is effective in the treatment of a well having a downhole temperature greater than 200° F. and more typically greater than 250° F. In most instance, the aqueous acid system is effective in the treatment of wells having a temperature greater than 300° F. In an embodiment, the downhole temperature in the well may be up to 500° F. The well may be shut-in for periods which may range from at least 30 minutes at such downhole temperatures. Shutting in the well provides for deeper penetration of the acid into the rock matrix.

The aqueous delayed acid system described herein further decreases friction pressures during pumping of treatment fluid into the well.

In an embodiment, the viscosity of the aqueous delayed acid system, when pumped into the well penetrating the formation, may be from about 0.5 cP to about 10 cP (measured on a Model 35 Fann viscometer having a R1B1 rotor and bob assembly rotating at 300 rpm at 225° F.).

The amount of water in the aqueous delayed acid system is that amount sufficient to dissolve the acid. In various embodiments, the amount of water in the aqueous delayed acid system is less than 80 wt %, or less than 60 wt %, or less than 40 weight percent or less than 20 wt %, or even less than 8 wt %.

The aqueous acidizing fluid, in addition to the HF or HF-generating compound, further contains an organophosphonate, urea or a urea derivative and an organic bifunctional compound which contains at least one hydroxyl group and at least one quaternary organophosphonium or ammonium moiety. The combination of the urea or urea derivative, bifunctional organic compound and organophosphonate enables retardation in the release of fluoride ions into the formation.

Typically, the amount of urea in the fluid is from about 15 to about 30 wt. percent based on the total weight of the fluid. The amount of bifunctional organic compound in the fluid is from about from about 0.1 to about 15 wt. percent based on the total weight of the aqueous fluid. Exemplary bifunctional organic compounds are those containing both a quaternary phosphonium or ammonium group and a —OH group. In some instances, the bifunctional organic compound contains more than one quaternary phosphonium or ammonium group and/or more than one —OH group.

Preferred bifunctional organic compounds are phosphonium hydroxyl alkyls and the salts thereof, such a $C_1$-$C_4$ alkyl salts such as phosphonium chloride and sulfate based compounds. Exemplary of such bifunctional organic compounds are the tetrakishydroxymethyl phosphonium salts, such as tetrakis(hydroxymethyl) phosphonium chloride of the structure (X):

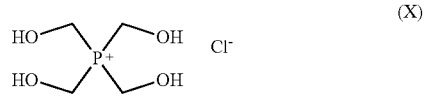

Exemplary bifunctional organic compounds are those containing at least one ammonium moiety and at least one —OH group. These include, for instance, choline chloride, as well as hydroxyalkyl ammonium salts, such as hydroxyethyl ammonium salts like trimethyl hydroxyethyl ammonium chloride as well as hydroxy ammonium salts greater than or equal to five to fifteen carbon atoms like bis(hydroxyethyl)dimethyl ammonium chloride and salts of the structure (XI):

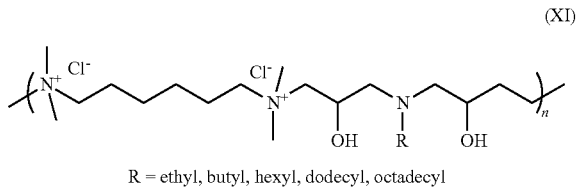

R = ethyl, butyl, hexyl, dodecyl, octadecyl

Other exemplary bifunctional organic compounds include salts of nitrogen containing heterocyclic rings, like salts of imidazolines, including alkyl substituted imidazolium salts. Exemplary imidazoline salts are 1-butyl-3-methylimidazolium chloride; 1-ethyl-3-methylimidazolium chloride; 1-ethyl-3-methylimidazolium acetate; N-methylpyrrolinium acetate; N-methylpyrrolinium chloride; 1-butyl-4-methylpyridinium chloride; 1,3-dimethylimidazolium dimethylphosphate; 1-ethyl-3-methylimidazolium ethyl sulfate; 1-ethyl-3-methylimidazolium methylsulfonate; 1-ethyl-3-methylimidazolium hydroxide; 1-butyl-3-methylimidazolium methanesulfonate; methyl-tri-n-butylammonium methyl sulfate; 1,2,4-trimethylpyrazolium methyl sulfate; 1-ethyl-2,3-dimethylimidazolium ethyl sulfate; 1,2,3-trimethylimidazolium methyl sulfate; chloride; methylimidazolium methylimidazolium hydrogen sulfate; 1-ethyl-3-methylimidazolium hydrogen sulfate; 1-butyl-3-methylimidazolium hydrogen sulfate; 1-butyl-3-methylimidazolium acetate; 1-butyl-3-methylimidazolium methyl sulfate; 1-ethyl-3-methylimidazolium thiocyanate; 1-butyl-3-methylimidazolium thiocyanate; choline acetate; choline salicylate; 1-ethyl-3-methylimidazolium nitrate, 1-ethyl-3-methylimidazolium tosylate, 1-ethyl-3-methylimidazolium bromide, 1-allyl-3-methylimidazolium chloride, 1-methyl-3-propylimidazolium iodide, 1-butyl-1-methylpyrrolidinium dicyanamide and tributylmethylphosphonium methyl sulfate.

Typically, the amount of organophosphonate in the fluid is from about 0.5 to about 15 wt. percent based on the total weight of the aqueous fluid. Typically, the organophosphonate is of the structure:

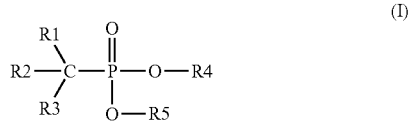

(I)

wherein R1, R2 and R3 are independently selected from the group consisting of hydrogen, alkyl, aryl, phosphonates, phosphates, acyl amine, hydroxy and carboxyl groups and R4 and R5 are independently selected from the group consisting of hydrogen, sodium, potassium, ammonium and organic radicals. Such organophosphonates include 1-hydroxyethylidine-1,1-diphosphonic acid, diethylene triamine penta(methylene phosphonic acid) and amino tri(methylene phosphonic acid) and its pentasodium salt, 1-hydroxyethylidene-1,1-diphosphonic acid and its tetrasodium salt, hexamethylenediaminetetra (methylene phosphonic acid) and its hexapotassium salt, and diethylenetriaminepenta (methylene phosphonic acid) and its hexasodium salt as well as mixtures thereof.

The source of the HF-generating component may be ammonium bifluoride or ammonium fluoride or a combination thereof. Use of a HF-generating component offers a means of reducing the reaction rate of HF within the area surrounding the wellbore as slow hydrolysis of the HF-generating compound (like ammonium bifluoride and ammonium fluoride) is converted to HF. Typically, the amount of HF or HF-generating component in the acidizing solution is generally between from about 0.25 to about 20 weight percent, preferably between from about 0.5 to about 15 weight percent, more preferably from about 1.0 to about 6 weight percent (based on the total weight of the aqueous fluid).

The fluid may further contain an inorganic acid such as hydrochloric acid, nitric acid, phosphoric acid, sulfuric acid, hydrofluoric acid, hydrobromic acid, perchloric acid, sulfamic acid and hydrogen iodide as well as an organic acid and mixtures thereof. Exemplary organic acids are alkanesulfonic acids (such as methanesulfonic acid), arylsulfonic acids, acetic acid, chloroacetic acid, formic acid, alkyl carboxylic acids, acrylic acid, lactic acid, glycolic acid, malonic acid, fumaric acid, glutamic acid, citric acid, lactic acid, tartaric acid, glutamic acid-N,N-diacetic acid (GLDA), hydroxyl ethylene diameinetriacetic acid (HDEDTA), N-hydroxyethyl-N, N', N'-ethylenediaminetriacetic acid (HEDTA), hydroxyethyliminodiacetic acid (HEIDA), diethylenetriaminepentaacetic acid (DTPA) and cyclohexylenediaminetetraacetic acid (CDTA) or an organic diacid mixture of adipic, succinic and glutaric acids available as StimCarb HTOA from Baker Hughes Holdings LLC. When present, the amount of inorganic or organic acid in the fluid is from about 0.1 to 15 weight percent based on the total weight of the fluid.

The aqueous fluid may further contain from about 0.1 to about 10 wt. % (based on the total weight of the fluid) of a fluoroboric acid or a boron compound capable of being hydrolyzed to form a $BF_4^-$ complex when exposed to $F^-$ or a hydrofluoric acid source.

The fluid may further contain a zirconium or antimony compound. In an embodiment, the zirconium compound, as well as antimony and fluoroboric acid or boron compound may be used to inhibit fluoride ions from reacting with the formation. Such compounds tie up fluoride ions; fluoride ions are thus slowly released as the equilibrium changes as the fluid is introduced to the formation. The binding of the fluoride ions provides greater penetration and worm holing in the formation and thus increases production without increasing damage to the formation and metallurgy.

In addition, the tying of fluoride ions has been shown to reduce corrosion. As such, the compounds provide effective protection to downhole metallic surfaces when the surfaces are exposed to fluoride ion-containing acidic fluids. The zirconium compound, as well as the fluoroboric acid, are of particular value in inhibiting and reducing corrosion in tubulars, such as those made of titanium alloys and titanium containing alloys. These components further make it possible for spent fluoride ion-containing acidic fluids to return to the surface through production riser systems.

When present, the amount of zirconium and/or antimony compound in the aqueous fluid is from about 0.1 to about 15 wt. percent (based on the total weight of the fluid). Examples of the zirconium compound include zirconium lactate; sodium zirconium lactate; zirconium sulfate; zirconium tetrachloride; zirconium carbonate; zirconium acetate; zirconium orthosulfate; zirconium oxychloride; zirconium ammonium carbonate; or zirconium acetylacetonate. Preferably the zirconium compound comprises zirconium lactate, sodium zirconium lactate, or a combination thereof. Antimony compounds include antimony chloride, antimony bromide, or a combination thereof. Combinations of the zirconium and/or antimony compounds can be used.

The aqueous fluid may further include an aluminum compound. Examples of the aluminum compound include alumina oxide, aluminum chlorohydrate; polyaluminum sulfate; aluminum sulfate; sodium aluminate; aluminum chloride; aluminum nitrate; or aluminum citrate. Preferably, the aluminum compound comprises aluminum chlorohydrate. When present, the amount of aluminum compound in the aqueous fluid is from about 0.1 to about 5 wt percent (based on the total weight of the fluid). When both present, the relative amounts of the zirconium compound and the aluminum compound can be adjusted to about 10:1 to about 1:1, about 5:1 to about 1:1, or about 4:1 to about 2:1.

The aqueous delayed acid system may further contain an organophosphorus surfactant, the organophosphorus surfactant likely adsorb onto the surface of the formation. When present, the amount of surfactant in the aqueous fluid is from about 0.1 wt. percent to about 5 weight percent. The organophosphorus surfactant likely absorbs onto the surface of the formation. With the organophosphonate and urea (or urea derivative), the organophosphorus surfactant inhibits reactivity of the acid by limiting sites for bonding of the acid onto the formation surface.

The organophosphorus surfactant of the aqueous delayed acid system preferably has a hydrophilic and hydrophobic tail and include those having at least one —OH group, at least one alkyl group, and at least one ammonium or a phosphonium group Exemplary organophosphorus surfactants are amino phosphonates. Suitable amino phosphonates include phospholipids, such as those of the structure (I):

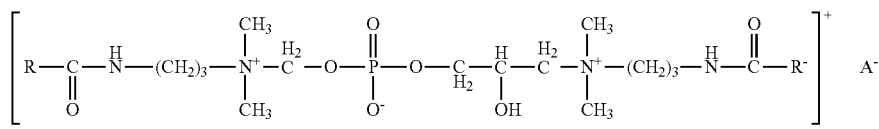

wherein R and R' are $C_6$ to $C_{25}$ hydrocarbon groups and A is any suitable anion to counter the cationic charge, preferably a conjugate base of a strong inorganic acid or organic acid. Preferably, the anion is selected from the group consisting of halides, nitrates, sulfates, phosphates, anions of $C_1$ to $C_{10}$ organic acids, and combinations of these. Preferred phospholipids include one or more fatty acid amidopropyl propylene glycol dimonium phosphate salts in which the fatty acid is a $C_{10}$ to $C_{25}$ fatty acid. These include cocadmidopropyl PG-dimonium chloride phosphate salts (also known as 1-propanaminium 3,3',3"-[phosphinylidynetris(oxy)]tris[N-(3-aminopropyl)-2-hydroxy-N,N-dimethyl-N,N',N"-tri-$C_{6-18}$ acyl derivatives. In another preferred embodiment, the amino organophosphorus surfactant is ricinoleamidopropyl PG-dimonium chloride phosphate. Preferred are dilinoleamidopropyl PG-dimonium chloride phosphates such as sodium cocamidopropyl PG-dimonium chloride phosphate and sodium dilinoleamidopropyl PG-dimonium chloride phosphate.

Other preferred phospholipids include dimer dilinoleamido-propyl PG-dimonium chloride phosphate; linoleamidopropyl PG-dimonium chloride phosphate dilinoleamidopropyl PG-dimonium chloride phosphate as well as mixtures thereof.

Preferred surfactants also include 1-propanaminium, 3,3',3"-[phosphinylidynetris(oxy)]tris[N-(3-aminopropyl)-2-hydroxy-N,N-dimethyl-,N,N',N"-tri-$C_{6-18}$ acyl derivatives trichlorides (CAS 83682-78-4).

In another embodiment, the amino organophosphonate surfactant may be an ester based phosphobetaine having, as an amine group, quaternized nitrogen. Hence the products are amphoteric, having both an anionic and cationic group present on the same pendant group. The compounds may have a pendant amphoteric group, and an ester linkage and may be represented by the formula (II):

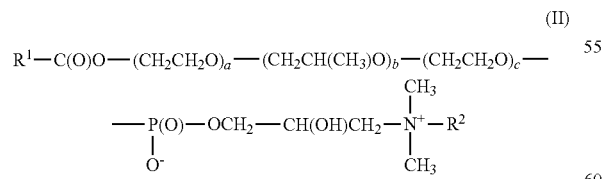

wherein:
R$^1$ is alkyl or alkylene having between 7 and 21 carbon atoms;
a, b and c independently are integers ranging from 0 to 20, with the proviso that a+b+c be equal to or greater than 1;

R$^2$ is selected from the group consisting of alkyl having 7 to 21 carbon atoms and R$^3$—C(O)—N(H)—(CH$_2$)$_2$— where R$^3$ is alkyl having 7 to 21 carbon atoms.

In an embodiment, b and c are 0 and a is 3. Such compounds may be prepared as set forth in U.S. Pat. No. 6,794,524.

In another embodiment, the amino phosphonate surfactant may be an oil soluble blend of a tertiary alkyl amine and an amino phosphonic acid. The tertiary alkyl is typically a tertiary alkyl primary amine having at least one amine group. The amines typically may contain from about 12 to about 14 carbon atoms. Suitable proportions of tertiary amine:amino phosphonic acid are those having a weight ratio of 100:1 to 1:3, more usually 8:1 to 3:2 for amine to amino phosphonic acid.

Examples of suitable amino phosphonic acids are hexamethylene diamine tetrakis (methylene phosphonic acid); diethylene triamine tetra (methylene phosphonic acid); diethylene triamine penta (methylene phosphonic acid) (DETPMP); bis-hexamethylene triamine pentakis (methylene phosphonic acid); diglycol amine phosphonate (DGA phosphonate); 1-hydroxyethylidene 1,1-diphosphonate (HEDP phosphonate); bisaminoethylether phosphonate (BAEE phosphonate. amino tri(methylenephosphonic acid) (ATMP), 2-hydroxyethyliminobis (methylenephosphonic acid) (HEBMP), ethylene diamine tetra(methylene phosphonic acid); ethylene diamine tetra(methylene phosphonic acid) derivatives; as well as mixtures thereof.

In another embodiment, the organophosphorus surfactant may be a phosphino derivatized or partially neutralized carboxylate polymer salt of approximate number average molecular weight from about 500 to 20,000, typically from about 1,000 to 6,000.

Exemplary phosphino carboxylic salts include:
(i) homopolymeric phosphinopoly(meth)acrylic acids of the formula:

wherein:
R$^1$ is a residue —OX wherein X is selected from a hydrogen atom, an alkali metal or alkaline earth metal cation, an ammonium ion or an amine residue;
R$^2$ is a polymeric residue comprising at least one unit of formula (IV):

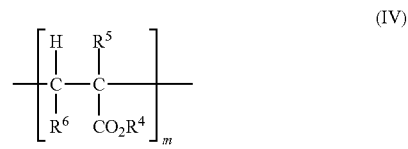

and optionally at least one unit of formula (V):

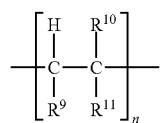

R³ is selected from a residue —OX wherein X is selected from a hydrogen atom, an alkali metal or alkaline earth metal cation, an ammonium ion or an amine residue; a hydrogen atom; or a polymeric residue comprising at least one unit of formula (IV) and optionally at least one unit of formula (V);

R⁴ is selected from a hydrogen atom; an alkali metal cation, an ammonium ion or an amine residue; an alkyl group having from 1 to 4 carbon atoms; or a phenyl group;

R⁵ is selected from: a hydrogen atom; a methyl group or a group —CO²R⁷, R⁷ is an alkyl group comprising from 1 to 4 carbon atoms;

R⁶ is selected from a hydrogen atom; an alkyl group comprising 1 to 4 carbon atoms optionally substituted by a hydroxyl group; or a group —CO₂R⁸ wherein R⁸ is selected from a hydrogen atom or an alkyl group comprising from 1 to 4 carbon atoms;

R⁹ is selected from a hydrogen atom; a methyl group; or a group —CO₂ R¹² wherein R¹² is selected from a hydrogen atom or an alkyl group comprising from 1 to 8 carbon atoms;

R¹⁰ is selected from a hydrogen atom; an alkyl group comprising from 1 to 4 carbon atoms; a hydroxymethyl group; or a group —CO₂R¹³ wherein R¹³ is selected from a hydrogen atom or an alkyl group comprising from 1 to 8 carbon atoms;

R¹¹ is selected from: a sulfonate containing group; a residue —CO₂R¹⁴ wherein R¹⁴ is selected from a hydrogen atom or an alkyl group comprising from 1 to 4 carbon atoms; a straight or branched alkyl residue having 1 to 8 carbon atoms optionally substituted by one to three carboxylic acid groups; a phenyl residue; an acetoxy residue; hydroxymethyl; an acetoxymethyl residue; —SO₃M, —CH₂SO₃M, —PO₃M₂ or PO₃M'₂ in which M is selected from hydrogen, an alkali metal or an alkaline earth metal and each M' is M or C₁-C₄ alkyl; a residue —CONR¹⁵R¹⁶ wherein R¹⁵ and R¹⁶ are the same or different and each is selected from hydrogen, a straight or branched chain alkyl residue having 1 to 8 carbon atoms, hydroxymethyl or a residue —CH(OH)—CO₂M, —C(CH3)₂CH₂SO₃M or —C(CH₃)₂CH₂PO₃M₂ in which M is selected from hydrogen, an alkali metal or alkaline earth metal; or —N(R¹⁷)COCH₃ in which R¹⁷ is selected from hydrogen or C₁-C₄ straight or branched chain alkyl;

m is from 1 to 300, preferably 1 to 200, more preferably 5 to 100;

n is from 1 to 300, preferably 1 to 200, more preferably 5 to 100;

n+m is from 3 to 300, preferably 3 to 200, more preferably 5 to 100; and the ratio of n:m is from 99:1 to 1:99.

(ii) a homopolymeric phosphinopoly(meth) acrylic acid having the formula (VI):

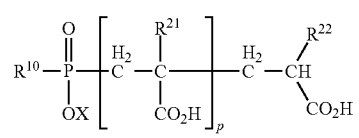

wherein:
X is selected from a hydrogen atom or an alkali metal cation;
R²¹ is a hydrogen atom or a methyl group;
R²² is selected from a hydrogen atom or a methyl group; and
R²⁰ is selected from a hydrogen atom or a group of formula (VII):

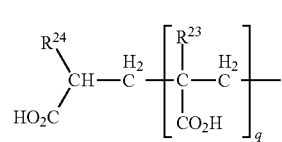

wherein R²³ is selected from a hydrogen atom or a methyl group, R²⁴ is selected from a hydrogen atom or a methyl group and p and q are integers;

(iii) a phosphino polymer of the formula (VIII):

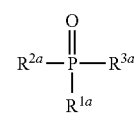

wherein:
R¹ᵃ is an —OX residue and X is selected from hydrogen or an alkali metal cation;
R²ᵃ is a copolymer of acrylic acid and 2-acrylamido-2-methylpropane sulfonic acid (AMPS) in a molar ratio of from 1:20 to 20:1; and
R³ᵃ is a copolymer of acrylic acid and 2-acrylamido-2-methylpropane sulfonic acid (AMPS) or an —OX residue wherein X is selected from hydrogen or an alkali metal cation in a molar ratio of from 1:20 to 20:1; and (iv) a phosphino polymer having formula (IX):

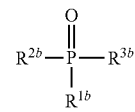

wherein:
R¹ is an —OX residue wherein X is selected from hydrogen or an alkali metal cation;
R² is a homopolymer of acrylic acid or methacrylic acid;
R³ is a homopolymer of acrylic acid or methacrylic acid or is an —OX residue
wherein X is selected from hydrogen or an alkali metal cation.

In an embodiment, especially in those instances where the aqueous delayed acidizing fluid contains an organic acid, a pre-flush buffer acid solution may be pumped prior to the pumping of the acidizing fluid and/or a post-flush buffer acid solution may be pumped subsequent to the pumping of the aqueous delayed acidizing fluid. Typically, the buffered acid solution is void of either hydrofluoric acid or hydrofluoric acid precursor. Further, the buffered acid solution does not typically contain an inorganic acid, such as HCl. The buffered acid solution may be helpful in converting any unconverted ammonium bifluoride and/or ammonium fluoride of the aqueous delayed acidizing fluid into HF.

The pH of the pre-flush and/or post-flush buffered acid solution is substantially equivalent to the pH of the aqueous delayed acid system. Typically, the pH of the buffered acid solution is from about 3.2 to about 4.8.

The buffered acid solution typically contains at least one organic acid and at least one organic acid salt. The organic acid of the organic acid salt may be the same or different from the organic acid per se. The organic acid is often not completely dissociated in water. This results in a higher pH at a given molar concentration (compared to a fully dissociated mineral acid). Generally, the molar ratio of organic acid:salt of organic acid is between from about 30:1 to about 1:5 and the amount of composite organic acid and salt of organic acid in the pH buffered acid solution is between from about 1 to about 20 weight percent. Preferred as the organic acid or the organic acid of the organic salt are weak acids such as acetic acid, formic acid, citric acid, lactic acid, fumaric acid, propionic acid, butyric acid, chloroacetic acid, edetatic acid, pentateic acid as well as mixtures thereof.

The aqueous delayed acid system may further contain a supplemental retarding agent for reducing acid activity. Non-limiting examples of such retarding agents include salt compounds having a cation selected from one or more of lithium, sodium, potassium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin and an anion selected from one or more of fluoride, chloride, bromide, iodide, sulfate, bisulfate, sulfite, and bisulfite nitrate as well as lysine. Further, the aqueous composition may be combined with one or more other additives known to those of skill in the art, such as, but not limited to, corrosion inhibitors, corrosion inhibitor intensifiers, scale inhibitors, demulsifiers, nonemulsifiers, foaming agents, hydrogen sulfide scavengers, reducing agents and/or chelants, and the like. When present, such component(s) may be present in an amount of from about 0.2% to about 3% by total weight of the treatment fluid.

EXAMPLES

The following examples are illustrative of some of the embodiments referenced herein. Other embodiments within the scope of the claims will be apparent to one skilled in the art from consideration of the description provided. It is intended that the specification, together with the examples, be considered exemplary only, with the scope and spirit of the invention being indicated by the claims which follow.

All percentages set forth in the Examples are given in terms of weight units except as may otherwise be indicated.

Examples

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

Example 1. A buffered HF sandstone acid solution, as described in U.S. Pat. No. 5,529,125 containing ammonium bifluoride, hydrochloric acid and 1-hydroxyethylidene-1,1-diphosphonic acid, was prepared.

To the sandstone acid was then added a solution of choline chloride, urea and a phosphobetaine surfactant. The resulting acidizing solution contained about 0.5 to about 4 weight percent of HF acid, about 1 to about 5 weight percent HCl, about 1 to about 5 weight percent of the diphosphonic acid, about 20 to wt. % choline chloride, about 20 wt. % urea, and about 0.5 to about 2 wt. % of phosphobetaine surfactant. To the acidizing solution was added about 5 to about 10 wt. % of zirconium lactate (with aluminum chlorohydrate) or boric acid.

A static dissolution test was then conducted to measure the delay in reaction of HF by exposing bentonite clay to the solution after one hour at 180° F. The percent solubility of the buffered HF sandstone acid was 37.2% compared to the acidizing solution (6.3%), the acidizing solution plus zirconium compound (10.80) and acidizing solution plus boric acid (11.4%).

Example 2. Example 2 was repeated except the buffered HF sandstone acid further contain an organic acid. The resulting acidizing solution contained about 0.5 to about 4 weight percent of HF acid, about 1 to about 5 weight percent HCl, about 2 to about 5 wt. percent of organic acid, about 1 to about 5 weight percent of the diphosphonic acid, about 20 wt. % choline chloride, about 20 wt. % urea, and about 0.5 to about 2 wt. % of phosphobetaine surfactant. The static dissolution test was then conducted to measure the delay in reaction of HF by exposing bentonite clay to the solution after one hour at 180° F. The percent solubility of the buffered HF sandstone acid was 26% compared to the acidizing solution (11%), the acidizing solution plus zirconium compound (14.5) and acidizing solution plus boric acid (7.2%).

Both Examples 1 and 2 show a decrease in the amount of bentonite dissolved which is indicative of lower acid reactivity. The delay reaction with bentonite clay is also seen with those fluids containing zirconium and/or boric acid compared to the sandstone acid by itself. The zirconium or boric acid is believed to temporarily bind the fluoride ion which makes it unavailable for retarding the acid. Thus, the acid pumped into the formation will extend into the formation. Stimulation farther down the wellbore is thus possible.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth herein should be interpreted as illustrative, and the scope of the disclosure and the appended claims should not be limited to the embodiments described and shown herein.

Embodiment 1. An aqueous composition for use in acidizing a subterranean formation comprising (a) an organic bifunctional compound containing at least one hydroxyl group and at least one quaternary or phosphonium group; (b) HF or a HF-generating component; (c) urea or a urea derivative; (d) an organophosphonate of the structure:

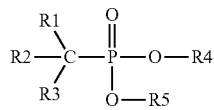

wherein R1, R2 and R3 are independently selected from the group consisting of hydrogen, alkyl, aryl, phosphonates, phosphates, acyl amine, hydroxy and carboxyl groups and R4 and R5 are independently selected from the group consisting of hydrogen, sodium, potassium, ammonium and organic radicals; and (e) water.

Embodiment 2. An aqueous composition for use in acidizing a subterranean formation comprising (a) from about 0.1 to about 15 wt. percent of an organic bifunctional compound containing at least one hydroxyl group and at least one quaternary or phosphonium group; (b) from about 0.25 to about 15 wt. percent of an HF or a HF-generating component; (c) from about 15 to about 30 wt. percent of urea or a urea derivative; (d) from about 0.5 to about 15 wt. percent of an organophosphonate of the structure:

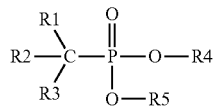

wherein R1, R2 and R3 are independently selected from the group consisting of hydrogen, alkyl, aryl, phosphonates, phosphates, acyl amine, hydroxy and carboxyl groups and R4 and R5 are independently selected from the group consisting of hydrogen, sodium, potassium, ammonium and organic radicals; and (e) water.

Embodiment 3. The aqueous composition of Embodiment 1 or 2, further comprising (i) a zirconium compound; (ii) fluoroboric acid or a boron compound capable of being hydrolyzed to form a $BF_4^-$ complex when exposed to $F^-$ or a hydrofluoric acid source; (iii) an aluminum material; or (iv) a combination thereof.

Embodiment 4. The aqueous composition of any of Embodiments 1 to 3, further comprising (i) from about 0.1 to about 15 wt. percent of a zirconium compound; (ii) from about 0.1 to about 10 wt. % of a fluoroboric acid or a boron compound capable of being hydrolyzed to form a $BF_4^-$ complex when exposed to $F^-$ or a hydrofluoric acid source; (iii) from about 0.1 to about 5 wt. percent of an aluminum material; or (iv) a combination thereof.

Embodiment 5. The aqueous composition of Embodiment 3 or 4, wherein (ii) is boric acid.

Embodiment 6. The aqueous composition of any of Embodiments 3 to 5, wherein the zirconium compound is selected from the group consisting of zirconium lactate, sodium zirconium lactate; zirconium sulfate; zirconium tetrachloride; zirconium carbonate; zirconium acetate; zirconium orthosulfate; zirconium oxychloride; zirconium ammonium carbonate or zirconium acetylacetonate or a combination thereof.

Embodiment 7. The aqueous composition of any of Embodiments 3 to 6, wherein the aluminum material is selected from the group consisting of aluminum chlorohydrate; polyaluminum sulfate; aluminum sulfate; sodium aluminate; aluminum chloride; aluminum nitrate or aluminum citrate or a combination thereof.

Embodiment 8. The aqueous composition of any of Embodiments 1 to 7, further comprising an acid selected from the group consisting of hydrochloric acid, sulfuric acid, phosphoric acid, nitric acid, hydrofluoric acid, hydrobromic acid, perchloric acid, sulfamic acid, hydrogen iodide, alkanesulfonic acids, arylsulfonic acids, acetic acid, chloroacetic acid, formic acid, alkyl carboxylic acids, acrylic acid, lactic acid, glycolic acid, malonic acid, fumaric acid, glutamic acid, citric acid, lactic acid, tartaric acid, glutamic acid-N,N-diacetic acid (GLDA), hydroxyl ethylene diameinetriacetic acid (HDEDTA), N-hydroxyethyl-N, N', N'-ethylenediaminetriacetic acid (HEDTA), hydroxyethyliminodiacetic acid (HEIDA), diethylenetriaminepentaacetic acid (DTPA) and cyclohexylenediaminetetraacetic acid (CDTA).

Embodiment 9. The aqueous composition of Embodiment 8, wherein the amount of acid in the aqueous composition is from about 0.1 to about 15 wt. percent.

Embodiment 10. The aqueous composition of any of Embodiments 1 to 9, further comprising a surfactant selected from the group consisting of phospholipids; a phosphobetaine having at least one quaternized nitrogen; a phosphino carboxylic salt or a blend of a tertiary alkyl amine and an aminophosphonic acid; and a nitrogen containing heterocyclic ring.

Embodiment 11. The aqueous composition of Embodiment 10, wherein the amount of surfactant in the aqueous composition is from about 0.1 wt. percent to about 5 weight percent.

Embodiment 12. The aqueous composition of Embodiment 10 or 11, wherein the phospholipid is selected from the group consisting of:
(a) the structure (I):

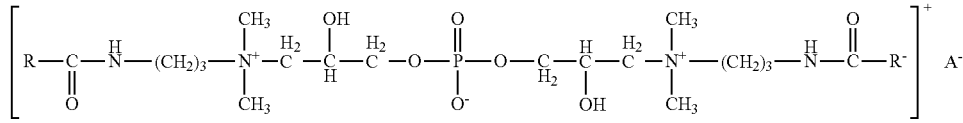

wherein R and R' are $C_6$ to $C_{25}$ hydrocarbon groups and A is selected from the group consisting of halide, nitrate, sulfate, phosphate, anions of $C_1$ to $C_{10}$ organic acids and mixtures thereof;

(b) a fatty acid amidopropyl propylene glycol dimonium phosphate salt wherein the fatty acid is a $C_{10}C_{25}$ fatty acid;

(c) an ester based phosphobetaine having a quaternized nitrogen; and (d) a phosphino derivatized or partially neutralized phosphinocarboxylate polymer of approximate number average molecular weight from about 500 to 20,000 and mixtures thereof.

Embodiment 13. The aqueous composition of Embodiment 10 or 11, wherein the aminophospholipid is selected from the group consisting of:
(a) a cocadmidopropyl PG-dimonium chloride phosphate salt;
(b) a ricinoleamidopropyl PG-dimonium chloride phosphate;
(c) a dilinoleamidopropyl PG-dimonium chloride phosphate;
(d) sodium cocamidopropyl PG-dimonium chloride phosphate;
(e) sodium dilinoleamidopropyl PG-dimonium chloride phosphate;
(a) dimer dilinoleamido-propyl PG-dimonium chloride phosphate; linoleamidopropyl PG-dimonium chloride phosphate dilinoleamidopropyl PG-dimonium chloride phosphate;
(b) a 1-propanaminium, 3,3',3"-[phosphinylidynetris(oxy)]tris[N-(3-aminopropyl)-2-hydroxy-N,N-dimethyl-,N,N',N"-tri-$C^{6-18}$ acyl derivatives trichloride; or a mixture thereof.

Embodiment 14. The aqueous composition of Embodiment 10 or 11, wherein the surfactant is a phosphobetaine of the formula (II):

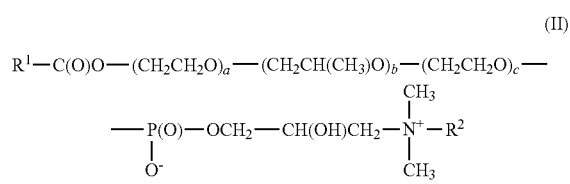

wherein:
R is alkyl or alkylene having between 7 and 21 carbon atoms;
a, b and c are each independently integers ranging from 0 to 20, with the proviso that a+b+c be equal to or greater than 1;
$R^2$ is selected from the group consisting of alkyl having 7 to 21 carbon atoms and
$R^3$—C(O)—N(H)—(CH$_2$)$_2$— where $R^3$ is alkyl having 7 to 21 carbon atoms.

Embodiment 15. The aqueous composition of any of Embodiments 1 to 14, wherein the organic bifunctional compound is choline chloride.

Embodiment 16. The aqueous composition of any of Embodiments 1 to 15, wherein the organophosphonate is selected from the group consisting of 1-hydroxyethylidene-1,1-diphosphonic acid; diethylene triamine penta (methylene phosphonic acid); and diethylenetriaminepenta (methylene phosphonic acid) and the salts thereof.

Embodiment 17. The aqueous composition of any of Embodiments 1 to 16, wherein the organic bifunctional compound is selected from the group consisting of:
(A) a phosphonium hydroxyl $C_1$-$C_4$ alkyl salt;
(B) a tetrakishydroxymethyl phosphonium salt;
(C) a hydroxyethyl ammonium salt;
or a combination thereof.

Embodiment 18. The aqueous composition of Embodiment 17, wherein the organic bifunctional compound is:
(a) a tetrakis(hydroxymethyl) phosphonium chloride of the structure (X):

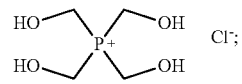

(b) choline chloride,
(c) trimethyl hydroxyethyl ammonium chloride;
(d) hydroxy ammonium salts greater than or equal to five to fifteen carbon atoms; and
(e) a salt of nitrogen containing heterocyclic ring.

Embodiment 19. The aqueous composition of Embodiment 17, wherein the hydroxyethyl ammonium salt is trimethyl hydroxyethyl ammonium chloride or choline chloride or a combination thereof.

Embodiment 20. The aqueous composition of any of Embodiments 1 to 16, wherein the organic bifunctional compound is selected from the group consisting of phosphonium hydroxyl alkyl and salts thereof, tetrakishydroxymethyl phosphonium salts, and hydroxy alkyl ammonium compounds.

Embodiment 21. A polymer-free composition for use in acidizing a subterranean formation comprising:
(a) choline chloride;
(b) HF or a HF-generating component;
(c) urea or a urea derivative;
(d) an organophosphonate of the structure:

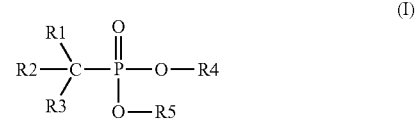

wherein R1, R2 and R3 are independently selected from the group consisting of hydrogen, alkyl, aryl, phosphonates, phosphates, acyl amine, hydroxy and carboxyl groups and R4 and R5 are independently selected from the group consisting of hydrogen, sodium, potassium, ammonium and organic radicals;
(e) at least one member selected from the group consisting of: (i) a zirconium compound selected from the group consisting of zirconium lactate, sodium zirconium lactate; zirconium sulfate; zirconium tetrachloride; zirconium carbonate; zirconium acetate; zirconium orthosulfate; zirconium oxychloride; zirconium ammonium carbonate or zirconium acetylacetonate or a combination thereof; and (ii) boric acid; and
water.

Embodiment 22. The polymer-free composition of Embodiment 21, comprising:
(a) from about 0.1 to about 15 weight percent of the choline chloride;
(b) from about 0.25 to about 15 weight percent of the HF or HF-generating component;
(c) from about 15 to about 30 weight percent of the urea or urea derivative;
(d) from about 0.5 to about 15 weight percent of the organophosphonate; and
(e) from about 0.1 to about 15 weight percent of at the least one member selected from the zirconium compound and the boric acid Embodiment 23. The polymer-free acidizing composition of Embodiment 21 or 22, wherein the organophosphonate is selected from the group consisting of 1-hydroxyethylidene-1,1-diphosphonic acid; diethylene triamine penta (methylene phosphonic acid); and diethylenetriaminepenta (methylene phosphonic acid) and the salts thereof.

Embodiment 24. The polymer-free acidizing composition of Embodiments 21 to 23, further comprising a surfactant selected from the group consisting of phospholipids; a phosphobetaine having at least one quaternized nitrogen; a phosphino carboxylic salt or a blend of a tertiary alkyl amine and an aminophosphonic acid; and a nitrogen containing heterocyclic ring.

Embodiment 25. A method of treating a subterranean formation penetrated by a well comprising:
(a) stimulating the formation with an acidizing composition of any of Embodiments 1 to 24; and
(b) enhancing permeability of the formation with the acidizing composition.

Embodiment 26. The method of Embodiment 25, comprising pumping the acidizing composition into the well at a pressure sufficient to create or enhance a fracture and reacting the acid with the formation to create conductive channels.

Embodiment 27. The method of Embodiment 25, comprising pumping the acidizing composition into the well at a pressure lower than that which induces creation of a fracture and creating conductive branched flow channels within the formation.

Embodiment 28. A method of stimulating a sandstone formation penetrated by a well comprising:
(A) introducing into a metallic tubular within the well a polymer-free acidizing composition comprising:
  (i) an organic bifunctional group containing at least one hydroxyl group and at least one quaternary or phosphonium group;
  (ii) HF or a HF-generating component;
  (iii) urea or a urea derivative;
  (iv) an organophosphonate of the structure:

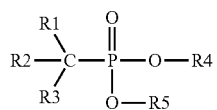

(I)

wherein R1, R2 and R3 are independently selected from the group consisting of hydrogen, alkyl, aryl, phosphonates, phosphates, acyl amine, hydroxy and carboxyl groups and R4 and R5 are independently selected from the group consisting of hydrogen, sodium, potassium, ammonium and organic radicals;
  (v) boric acid;
  (vi) a zirconium compound selected from the group consisting of zirconium lactate, sodium zirconium lactate; zirconium sulfate; zirconium tetrachloride; zirconium carbonate; zirconium acetate; zirconium orthosulfate; zirconium oxychloride; zirconium ammonium carbonate or zirconium acetylacetonate or a combination thereof, and
  (vii) water; and
(B) enhancing the creation and penetration of wormholes by retarding or slowing down the spending of the HF or HF-generating compound with the combination of organic bifunctional group, urea or urea derivative, zirconium containing compound and boric acid.

Embodiment 29. The method of any of Embodiments 25 to 28, wherein the temperature in the well is greater than 200° F.

Embodiment 30. The method of Embodiment 20, wherein the temperature in the well is greater than 250° F.

Embodiment 31. The method of Embodiment 39, wherein the temperature in the well is greater than 300° F.

Embodiment 32. The method of Embodiment 29, wherein the temperature in the well is less than 500° F.

Embodiment 33. The method of any of Embodiments 25 to 32, wherein a pre-flush fluid is first pumped into the well or formation prior to pumping the acidizing solution.

Embodiment 34. The method of any of Embodiments 25 to 33, wherein a post-flush fluid is pumped into the well or formation after pumping the acidizing solution.

Embodiment 35. The method of Embodiment 33 or 34, wherein the pre-flush fluid and/or post-flush fluid comprises at least one organic acid and at least one organic acid salt.

Embodiment 36. The method of Embodiment 35, wherein the organic acid and the organic acid of the organic acid salt are independently selected from the group consisting of acetic acid, formic acid, citric acid, lactic acid, fumaric acid, propionic acid, butyric acid, chloroacetic acid, edetatic acid, pentateic acid and mixtures thereof.

Embodiment 37. The method of any of Embodiments 33 to 36, wherein the pre-flush fluid and/or post-flush fluid are void of hydrofluoric acid.

Embodiment 38. The method of any of Embodiments 33 to 37, wherein the pre-flush fluid and/or post-flush fluid are void of an inorganic acid.

What is claimed is:

1. A method of treating a subterranean formation penetrated by a well comprising:
  (a) stimulating the subterranean formation by pumping into the subterranean formation an aqueous composition comprising:
    (i) an organic bifunctional compound containing at least one hydroxyl group and at least one quaternary ammonium or phosphonium group;
    (ii) a HF-generating component;
    (iii) urea;
    (iv) an organophosphonate of the structure:

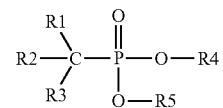

(I)

wherein R1 is hydrogen or an alkyl, R2 is a phosphonate; R3 is a hydroxyl group; and R4 and R5 are of hydrogen; and
    (v) water; and
  (b) enhancing creation and penetration of wormholes by retarding spending of acid in the subterranean formation with the aqueous composition.

2. The method of claim 1, comprising pumping the aqueous composition into the well at a pressure sufficient to create or enhance a fracture and reacting acid with the formation to create conductive channels.

3. The method of claim 1, comprising pumping the aqueous composition into the well at a pressure lower than that which induces creation of a fracture and creating conductive branched flow channels within the subterranean formation.

4. The method of claim 1, wherein the temperature in the well is greater than 200° F. but less than 500° F.

5. The method of claim 1, wherein a pre-flush fluid is pumped into the well prior to pumping the aqueous composition and/or a post-flush fluid is pumped into the well after pumping the aqueous composition and further wherein the pre-flush fluid and post-flush fluid comprises an organic acid and a salt of an organic acid.

6. The method of claim 1, wherein the subterranean formation is a sandstone formation and wherein the subterranean formation is stimulated by;
(A) introducing into a metallic tubular within the well the aqueous composition; and
(B) enhancing creation and penetration of wormholes by retarding or slowing down spending of the HF-generating compound with a combination of organic bifunctional group, urea and boric acid.

7. The method of claim 1, wherein the aqueous composition comprises:
(a) from about 0.1 to about 15 wt. percent of the organic bifunctional compound;
(b) from about 0.25 to about 15 wt. percent of the HF-generating component;
(c) from about 15 to about 30 wt. percent of the urea; and
(d) from about 0.5 to about 15 wt. percent of the organophosphonate.

8. The method of claim 1, wherein the aqueous composition further comprises (i) a zirconium compound; (ii) fluoroboric acid or a boron compound capable of being hydrolyzed to form a $BF_4^-$ complex when exposed to $F^-$ or a hydrofluoric acid source; (iii) an aluminum material; or (iv) a combination thereof.

9. The method of claim 8 wherein the aqueous composition comprises (i) from about 0.1 to about 15 wt. percent of the zirconium compound; (ii) from about 0.1 to about 10 wt. % of the fluoroboric acid or boron compound; and (iii) from about 0.1 to about 5 wt. percent of the aluminum material.

10. The method of claim 8, wherein
(a) the boron compound is boric acid;
(b) the zirconium compound is selected from the group consisting of zirconium lactate, sodium zirconium lactate; zirconium sulfate; zirconium tetrachloride; zirconium carbonate; zirconium acetate; zirconium orthosulfate; zirconium oxychloride; zirconium ammonium carbonate or zirconium acetylacetonate or a combination thereof; and/or
(c) the aluminum material is selected from the group consisting of aluminum chlorohydrate; polyaluminum sulfate; aluminum sulfate; sodium aluminate; aluminum chloride; aluminum nitrate or aluminum citrate or a combination thereof.

11. The method of claim 1, wherein the aqueous composition further comprises an acid selected from the group consisting of hydrochloric acid, sulfuric acid, phosphoric acid, nitric acid, hydrofluoric acid, hydrobromic acid, perchloric acid, sulfamic acid, hydrogen iodide, alkanesulfonic acids, arylsulfonic acids, acetic acid, chloroacetic acid, formic acid, alkyl carboxylic acids, acrylic acid, lactic acid, glycolic acid, malonic acid, fumaric acid, glutamic acid, citric acid, lactic acid, tartaric acid, glutamic acid-N,N-diacetic acid (GLDA), hydroxyl ethylene diameinetriacetic acid (HDEDTA), N-hydroxyethyl-N, N', N'-ethylenediaminetriacetic acid (HEDTA), hydroxyethyliminodiacetic acid (HEIDA), diethylenetriaminepentaacetic acid (DTPA) and cyclohexylenediaminetetraacetic acid (CDTA).

12. The method of claim 1, wherein the organophosphonate is selected from the group consisting of 1-hydroxyethylidene-1,1-diphosphonic acid; diethylene triamine penta (methylene phosphonic acid); and diethylenetriaminepenta (methylene phosphonic acid) and the salts thereof.

13. The method of claim 1, wherein the aqueous composition further comprises a surfactant selected from the group consisting of phospholipids; a phosphobetaine having at least one quaternized nitrogen; a phosphino carboxylic salt or a blend of a tertiary alkyl amine and an aminophosphonic acid and a nitrogen containing heterocyclic ring.

14. The method of claim 13, wherein the surfactant is selected from the group consisting of:
(a) a phospholipid of the structure (II):

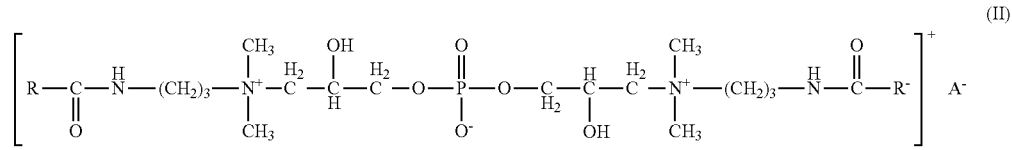

wherein R and R' are $C_6$ to $C_{25}$ hydrocarbon groups and A is selected from the group consisting of halide, nitrate, sulfate, phosphate, anions of $C_1$ to $C_{10}$ organic acids and mixtures thereof;
(b) a fatty acid amidopropyl propylene glycol dimonium phosphate salt wherein the fatty acid is a $C_{10}$ $C_{25}$ fatty acid;
(c) an ester based phosphobetaine having a quaternized nitrogen;
(d) a phosphino derivatized or partially neutralized phosphinocarboxylate polymer of approximate number average molecular weight from about 500 to 20,000; and mixtures thereof,
(e) a cocadmidopropyl PG-dimonium chloride phosphate salt;
(f) a ricinoleamidopropyl PG-dimonium chloride phosphate;
(g) a dilinoleamidopropyl PG-dimonium chloride phosphate;
(h) sodium cocamidopropyl PG-dimonium chloride phosphate;
(i) sodium dilinoleamidopropyl PG-dimonium chloride phosphate;
(j) dimer dilinoleamido-propyl PG-dimonium chloride phosphate;
linoleamidopropyl PG-dimonium chloride phosphate dilinoleamidopropyl PG-dimonium chloride phosphate;
(k) a 1-propanaminium, 3,3',3"-[phosphinylidynetris (oxy)]tris[N-(3-aminopropyl)-2-hydroxy-N,N-dimethyl-, N,N',N"-tri-$C^{6-18}$ acyl derivatives trichloride; and (l) a phosphobetaine of the formula (II):

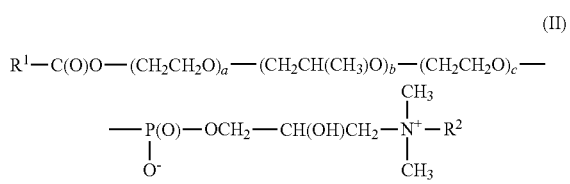

(II)

wherein:
R is alkyl or alkylene having between 7 and 21 carbon atoms;
a, b and c are each independently integers ranging from 0 to 20, with the proviso that a+b+c be equal to or greater than 1;
$R^2$ is selected from the group consisting of alkyl having 7 to 21 carbon atoms and
$R^3$—C(O)—N(H)—$(CH_2)_2$— where $R^3$ is alkyl having 7 to 21 carbon atoms
and mixtures thereof.

15. The method of claim 1, wherein the organic bifunctional compound is selected from the group consisting of:
   (a) a phosphonium hydroxyl $C_1$-$C_4$ alkyl salt;
   (b) a tetrakishydroxymethyl phosphonium salt;
   (c) a hydroxyethyl ammonium salt
and mixtures thereof.

16. The method of claim 15, wherein the organic bifunctional compound is selected from the group consisting of:
   (a) a tetrakis(hydroxymethyl) phosphonium chloride of the structure (X):

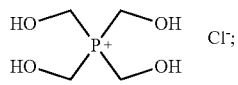

(b) choline chloride,
   (c) trimethyl hydroxyethyl ammonium chloride;

(e) hydroxy ammonium salts greater than or equal to five to fifteen carbon atoms; and
   (f) a salt of nitrogen containing heterocyclic ring.

17. The method of claim 1, wherein the aqueous composition is polymer-free and the organic bifunctional compound is choline chloride and further wherein the composition further comprises at least one member selected from the group consisting of: (i) a zirconium compound selected from the group consisting of zirconium lactate, sodium zirconium lactate; zirconium sulfate; zirconium tetrachloride; zirconium carbonate; zirconium acetate; zirconium orthosulfate; zirconium oxychloride; zirconium ammonium carbonate or zirconium acetylacetonate or a combination thereof; and (ii) a fluoroboric acid or a boron compound; and
   (f) water.

18. The method of claim 17, wherein the composition comprises:
   (a) from about 0.1 to about 15 weight percent of the choline chloride;
   (b) from about 0.25 to about 15 weight percent of the HF-generating component;
   (c) from about 15 to about 30 weight percent of the urea;
   (d) from about 0.5 to about 15 weight percent of the organophosphonate; and
   (e) from about 0.1 to about 15 weight percent of at the least one member selected from the zirconium compound and the fluoroboric acid or boron compound.

19. The method of claim 18, wherein the organophosphonate is selected from the group consisting of 1-hydroxyethylidene-1,1-diphosphonic acid; diethylene triamine penta (methylene phosphonic acid); and diethylenetriaminepenta (methylene phosphonic acid) and the salts thereof and further wherein the surfactant is selected from the group consisting of phospholipids; a phosphobetaine having at least one quaternized nitrogen; a phosphino carboxylic salt or a blend of a tertiary alkyl amine and an aminophosphonic acid; and a nitrogen containing heterocyclic ring and mixtures thereof.

* * * * *